US008102240B2

(12) United States Patent
Birchbauer et al.

(10) Patent No.: US 8,102,240 B2
(45) Date of Patent: Jan. 24, 2012

(54) CONTROLLER PROVIDING SHARED DEVICE ACCESS FOR ACCESS CONTROL SYSTEMS

(75) Inventors: Dave Dale Birchbauer, Waukesha, WI (US); Beth Thomas, Brown Deer, WI (US); Tareq (Rick) Huneidi, Fox Point, WI (US)

(73) Assignee: Honeywell International Inc., Morristown, NJ (US)

( * ) Notice: Subject to any disclaimer, the term of this patent is extended or adjusted under 35 U.S.C. 154(b) by 879 days.

(21) Appl. No.: 11/965,321

(22) Filed: Dec. 27, 2007

(65) Prior Publication Data

US 2009/0167485 A1 Jul. 2, 2009

(51) Int. Cl.

| | |
|---|---|
| ***G05B 19/00*** | (2006.01) |
| ***G06F 7/00*** | (2006.01) |
| ***G06K 19/00*** | (2006.01) |
| ***G08B 29/00*** | (2006.01) |
| ***G08C 19/00*** | (2006.01) |
| ***H04B 1/00*** | (2006.01) |
| ***H04Q 1/00*** | (2006.01) |
| ***B60R 25/00*** | (2006.01) |

(52) U.S. Cl. .......................... 340/5.61; 340/5.6; 340/5.7

(58) Field of Classification Search .......... 340/5.6–5.67, 340/5.7, 5.5, 5.2; 235/382, 382.5

See application file for complete search history.

(56) References Cited

U.S. PATENT DOCUMENTS

| | | | | |
|---|---|---|---|---|
| 4,003,026 | A * | 1/1977 | Wallerstein, Jr. | 340/5.73 |
| 4,721,954 | A * | 1/1988 | Mauch | 340/5.54 |
| 4,811,012 | A * | 3/1989 | Rollins | 340/5.25 |
| 4,822,990 | A * | 4/1989 | Tamada et al. | 235/492 |
| 5,418,525 | A * | 5/1995 | Frei et al. | 340/5.6 |
| 5,465,081 | A * | 11/1995 | Todd | 340/10.2 |
| 5,682,142 | A * | 10/1997 | Loosmore et al. | 340/572.1 |
| 5,979,754 | A * | 11/1999 | Martin et al. | 235/382 |
| 6,233,588 | B1 * | 5/2001 | Marchoili et al. | 1/1 |
| 6,390,374 | B1 * | 5/2002 | Carper et al. | 235/492 |
| 6,570,487 | B1 * | 5/2003 | Steeves | 340/5.2 |
| 6,738,772 | B2 * | 5/2004 | Regelski et al. | 1/1 |
| 6,747,564 | B1 * | 6/2004 | Mimura et al. | 340/825.6 |
| 7,009,489 | B2 * | 3/2006 | Fisher | 340/5.7 |
| 7,068,164 | B1 * | 6/2006 | Duncan et al. | 340/539.16 |
| 7,380,279 | B2 * | 5/2008 | Prokupets et al. | 726/27 |
| 2003/0163522 | A1 * | 8/2003 | Nakamura et al. | 709/203 |
| 2006/0022794 | A1 * | 2/2006 | Determan et al. | 340/5.52 |
| 2006/0126906 | A1 * | 6/2006 | Sato et al. | 382/118 |
| 2006/0214767 | A1 * | 9/2006 | Carrieri | 340/5.61 |
| 2007/0096868 | A1 * | 5/2007 | Bauchot et al. | 340/5.27 |

* cited by examiner

*Primary Examiner* — Daniel Wu
*Assistant Examiner* — Emily C Terrell
(74) *Attorney, Agent, or Firm* — Husch Blackwell

(57) ABSTRACT

An access control system and method for controlling access to secured areas includes a plurality of local readers connected to corresponding local control devices for reading portable access devices. A system reader reads the portable access devices, and a system control device is electrically connected to the local control devices. The system control device controls access to a common secure area using the system reader by validating the portable access devices using one of the local control devices. The system control device locally stores information from the portable access device and the associated local control device which may include validation or authentication data received from the associated local control device, so that repeat validation of the portable access device can be communicated from the associated local control device.

15 Claims, 2 Drawing Sheets

CONTROLLER PROVIDING SHARED DEVICE ACCESS FOR ACCESS CONTROL SYSTEMS

BACKGROUND OF THE INVENTION

1. Field of Invention

The present invention relates to an access control system and method for the same, and more specifically, a system and method for central administration of controlling access.

2. Description of Related Art

Currently, control devices such as access control panels and corresponding readers for multiple and separately owned or unrelated secured areas require separate access controls and presentable portable access devices. These requirements can lead to many readers for separate security systems being present at the same access point where a user is confused by the plurality of readers. The user must discern the appropriate reader to, for instance, swipe a user access card through. Another drawback of multiple readers at one access point is that one persons confusion and delay at the access pit can delay others also wanting to pass the secured point.

Therefore, a need exists for a system or method to eliminate the confusion of having multiple readers at one access point for different security systems. It would further be desirable for a system or method to eliminate the multiple readers necessary at a common access point for multiple security systems.

SUMMARY OF THE INVENTION

In an aspect of the invention, a method for controlling access to secure areas includes: reading and validating portable access devices using local readers and local control devices, respectively, for controlling access to corresponding local secure areas; controlling access to at least one common secure area using a system reader; reading the portable access devices using the system reader for accessing the common secure area; validating the portable access devices when read by the system reader using a system control device communicating with local control devices corresponding to local secure areas; and allowing access to the common secure area using the system control device when the portable access device is validated by one of the local control devices. The method may further include when validating the portable access devices: polling the local control devices for validation; and validating the portable access devices when the system control device receives validation from one of the local control devices. Additionally, the method may further include: saving identification data at the system control device indicating a specified local control device which validated a particular portable access device; and validating the particular portable access device at the system control device by polling the specified local control device for validation of the particular portable access device when identification data is stored at the system control device.

In a related aspect, the method further includes: electrically connecting the plurality of local control devices with the system reader; and electrically connecting the system control device with the plurality of local control devices.

In another related aspect, validating the portable access devices using the system control device further includes: communicating the access data from the portable access devices to the local control devices; receiving a valid access authentication from at least one of the local control devices; and selectively allowing access to one of the secure areas corresponding to the valid authentication received from corresponding local control device.

In a related aspect, the method includes: automatically invalidating a portable access device after a specified period of inactivity by the system control device. The method may also include: programming the system control device storing code in a computer having computer readable medium; allowing a user to edit portable programmable access device information; and presenting an event log for viewing by a user. Further, the programming may include encoding user access data, including times of valid and invalid access to one of the local secure areas and/or the common secure area.

In another aspect of the invention, an access control system includes a plurality of local readers for reading portable access devices. A plurality of local control devices are electrically connected to corresponding local readers controlling access to respective local secure areas using the portable access devices. A system reader reads the portable access devices, and a system control device is electrically connected to the local control devices for controlling access to a common secure area using the system reader. Controlling access is accomplished by validating the portable access devices when read by the system reader using the system control device communicating with the local control devices for authenticating the portable access devices. The system control device includes data storage, and stores information about each portable access device including the associated local control device which communicated authentication of the portable access device received by the system control device. The portable access devices may be access cards each including an identification element. The identification element may be a magnetic strip. The portable access device may include a microprocessor storing the identification element. The portable access device may also be a smart card having a microprocessor and data storage. In one alternative, a system control device may automatically invalidate a portable access device after a specified period of inactivity.

In a related aspect, the system control device includes a computer having programmable code embodied on computer readable medium; and a user interface communicating with the computer for allowing a user to edit portable access device information and view an event log.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF THE INVENTION

Figure 1:
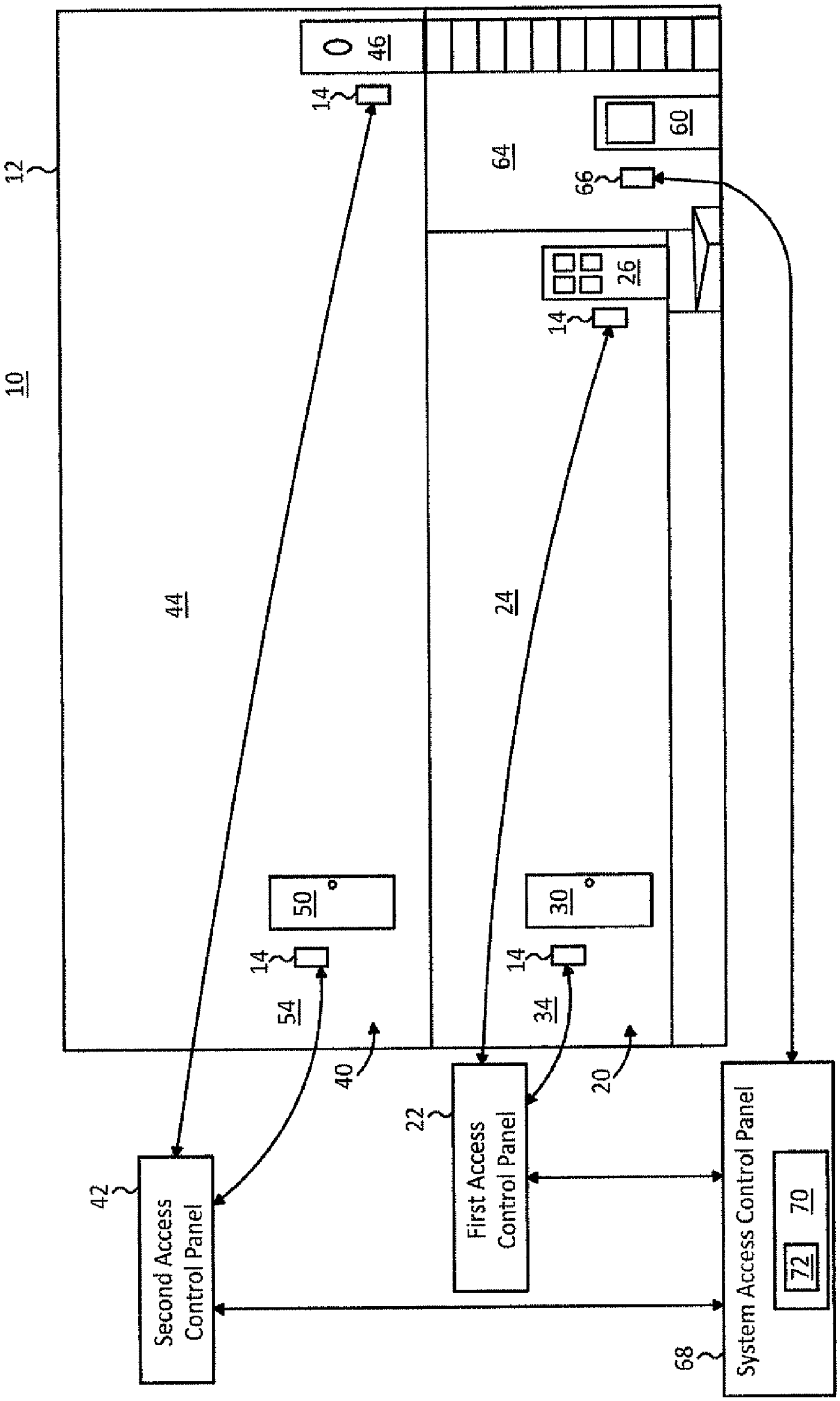
FIG. 1 is a block diagram depicting a building having multiple readers and local secured areas connected to local access control panels, and a common secure area and a system reader connected to a system access control panel.

Referring to FIG. 1, an illustrative embodiment of an access control system 10 and method for the same according to the present invention includes a plurality of local readers 14 for reading portable access devices (not shown), such as an access card. A plurality of local control device embodied as a first local control panel 22 and a second local control panel 24 are located, respectively, on the first and second floors 20, 40 of a building 12. The first and second local control panels 22, 42 are electrically connected to corresponding local readers 14 controlling access to a first secure area 24 and a second secure area 44 using the portable access devices via a first door 26 and a second door 46. Additional readers 14 provide access to a first office area 34 and a second office area 54 via first and second office doors 30, 50, respectively.

A system reader 66 reads the portable access devices and is electrically connected with a system control device embodied as a system access control panel 68. The system reader 66 reads the portable access devices for accessing the common secure area 64. The system access control panel 68 is electrically connected to the first and second control panels 22, 42 for controlling access to the first and second secure areas 24, 44, respectively, as well as first office area 34 and second office area 54. Access to a common secure area 64 is controlled by the system reader 66 adjacent a common door 60. The system reader 66 reads the portable access device, and the system access control panel 68 validates the portable access device using the first and second control panels 22, 42 by polling the first and second control panels 22, 42. After receiving an authentication of the portable access device, the system access control panel 68 allows access to the common secure area 64. Thus, the system access control panel 68 validates a portable access device by communicating with the first and second control panels 22, 42, respectively, to receive authentication or validation of the portable access device. Once validation of the portable access device is received by the system control panel 68, the system access control panel 68 allows access to the common door 60. Thus, a user can present the same portable access device at the system reader 66 which is presented at the local readers for access to the first and second secure areas 24, 44, respectively. Similarly, the same portable access device used to access the first and second office areas 34, 54 respectively, may be used at the system reader 66 to access the common door 60 because the system access control panel 68 communicates with the first and second access control panels 22, 42, respectively, to validate the portable access device. Therefore, the access control system allows for the same portable access device to be used in a common area, or similarly, for the same portable access device used for separate local security systems to be used to access the common secure area 64.

The system access control panel 68 includes a computer 70 having data storage 72, and stores information about each portable access device including the authentication of the portable access device received from the corresponding local control devices, i.e., first and second access control panels 22, 42, respectively. Thus, the system access control panel 68 stores identification information, which may include the authentication information, for identifying the combination of a portable access device and its corresponding local control device, i.e., the first or second access control panels 22, 42. The portable access devices may be access cards each including an identification element which may be a magnetic strip. Alternatively, the portable access device may include a microprocessor for storing the identification element, or be a smart card including a microprocessor and data storage. The system access control panel 68 may also include a user interface for communicating with the computer and allowing a user to edit portable access device information and view an event log.

Figure 2:
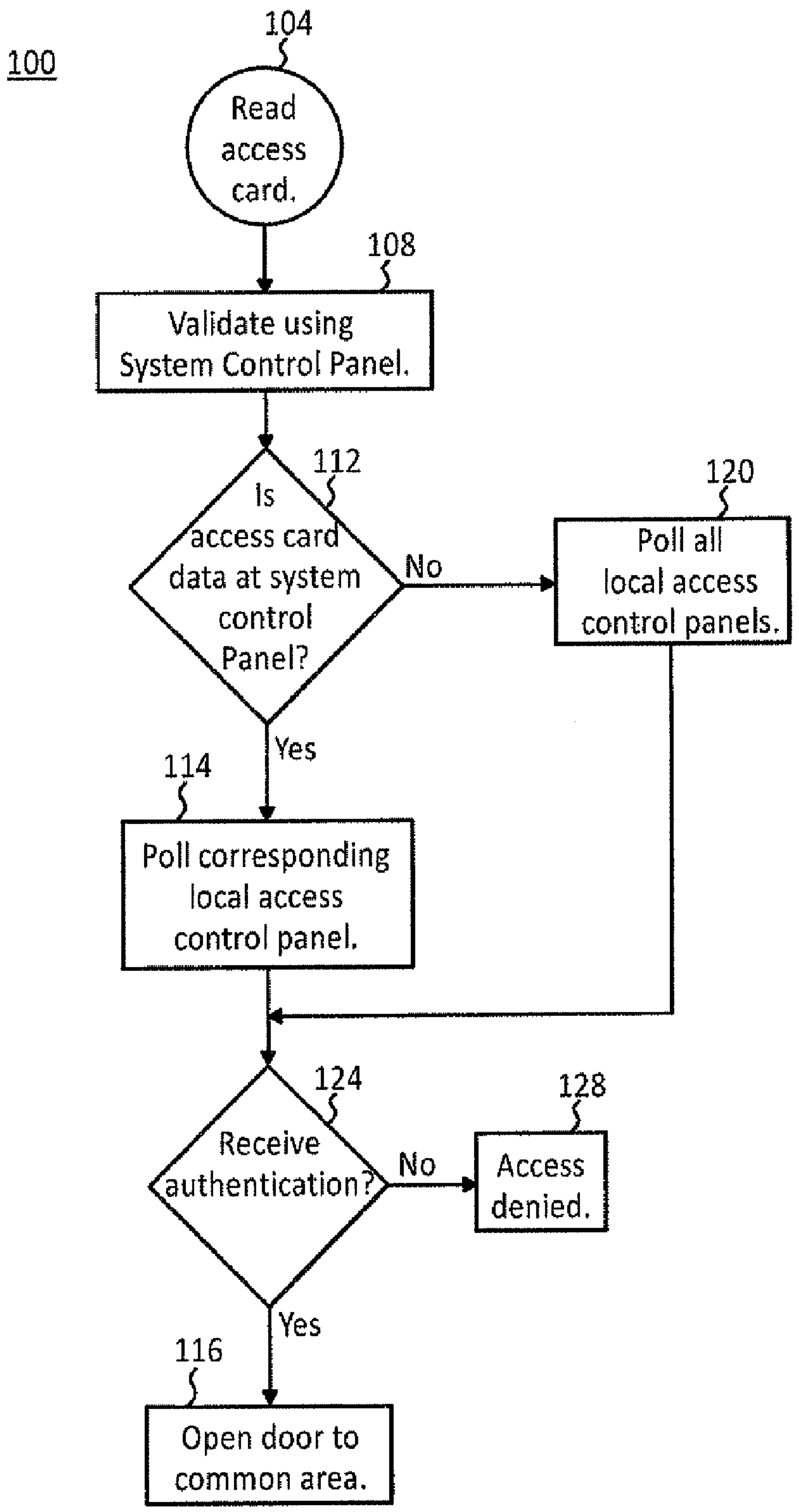
FIG. 2 is a flow chart depicting the method of the present invention shown in FIG. 1.

Referring to FIGS. 1 and 2, the method 100 for controlling access to secure areas includes reading and validating the portable access devices at step 104 by using the system reader 66 for controlling access to the common secure area 64. The portable access devices are validated at step 108 using the system access control panel 68 when read by the system reader 66. The method 100 determines if access card data for the access car presented to the system reader 66 is in the system access control panel 68 at step 112. If not, the system access control panel 68 receives a valid authentication of a portable access device from the first or second access control panel 22, 42, respectively, by polling the first and second access control panels 22, 42, as in step 120. If authentication information is received by the system access control panel 68, step 124, the system access control panel 68 stores the validation information in it's computer 70 for future reference regarding the portable access device and the corresponding local control device, i.e., the first or second access control panels 22, 42, and the common door 60 is opened to the common secure area 64, as in step 116. If no authentication is received, access is denied as in step 128. Thereafter, additional readings of a known portable access device only requires the system access control panel 68, as in step 114, to poll the corresponding first or second control panel 22, 42 to receive authenticating of the portable access device, and upon receiving such, open the door to the common areas as in step 116. Additionally, the system access control panel 68 may be programmed to automatically invalidating a portable access device after a specified period of inactivity.

In another embodiment, a plurality of common areas may be controlled in the same manner as in the embodiment previously described. Specifically, readers for multiple common areas can electrically communicate with the system access control panel 68 for authentication of portable access devices.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A method for controlling access to secure areas, comprising:
 - a first reader reading a first portable access card;
 - a first control device determining a validity of the first portable access card;
 - if the first control device determines the first portable access card is valid, providing access to a first secure area via a first door associated with the first reader and the first control device;
 - a second reader reading a second portable access card;
 - a second control device determining a validity of the second portable access card;
 - if the second control device determines the second portable access card is valid, providing access to a second secure area, different from the first secure area, associated with the second reader and the second control device;
 - a third reader reading one of the first or second portable access cards;
 - a third control device communicating with the first and second control devices to receive a validation of the one-of the first or second portable access cards; and
 - if the third control device receives the validation of the one of the first or second portable access cards, providing access to a third secure area, different from the first and second secure areas, associated with the third reader and the third control device wherein access to the first and second secure areas is provided first through the third secure area and then to the first and second secure areas.

2. The method of claim 1, wherein a third control device communicating with the first and second control devices to receive a validation of the one of the first or second portable access cards includes:

polling the local first and second control devices for validation; and validating the one of the first or second portable access cards when the third control device receives validation from one of the first or second control devices.

3. The method of claim 2, further including:

saving identification data at the third control device indicating a specified first or second control device which validated the one of the first or second portable access cards;

validating the one of the first or second portable access cards at the third control device by polling only the specified first or second control device for validation of the one of the first or second portable access cards when identification data is stored at the third control device.

4. The method of claim 1, further including:

electrically connecting the first and second control devices with the third reader; and electrically connecting the third control device with the first and second control devices.

5. The method of claim 1, wherein a third control device communicating with the first and second control devices to receive a validation of the one of the first or second portable access cards using the system control device further includes:

communicating access data associated with the one of the first or second portable access cards to the first and second control devices;

receiving a valid access authentication from at least one of the first or second control devices; and selectively allowing access to the third secure area.

6. The method of claim 1, further including:

automatically invalidating the one of the first or second portable access cards after a specified period of inactivity by the third control device.

7. The method of claim 1, further including:

programming the third control device storing code in a computer having computer readable medium;

allowing a user to edit portable programmable access cards information; and presenting an event log for viewing by a user.

8. The method of claim 7, wherein the programming comprises:

encoding user access data in the third control device including times of valid and invalid access to one of the first, second, or third secure areas.

9. An access control system, comprising:

a first reader for reading a first portable access card;

a first control device for determining a validity of the first portable access card and, when the first control device determines the first portable access card is valid, for providing access to a first secure area via a first door associated with the first reader and the first control device;

a second reader for reading a second portable access card;

a second control device for determining a validity of the second portable access card and, when the second control device determines the second portable access card is valid, for providing access to a second secure area, different from the first secure area, via a second door associated with the second reader and the second control device;

a third reader for reading one of the first or second portable access cards;

a third control device for communicating with the first and second control devices to receive a validation of the one of the first or second portable access cards and, when the third control device receives validation for the one of the first or second portable access cards, for providing access to a third secure area, different from the first and second secure areas, associated with the third reader and the third control device wherein access to the first and second secure areas is provided first through the third secure area and then to the first and second secure areas.

10. The access control system of claim 9, wherein the system third control device includes data storage and stores information about each portable access card including an associated first or second control device which communicated the validation of the one of the first or second portable access cards to the third control device.

11. The access control system of claim 10, wherein the identification element is a magnetic strip.

12. The access control system of claim 10, wherein each of the portable access cards includes a microprocessor storing the identification element.

13. The access control system of claim 10, wherein each of the portable access cards is a smart card having a microprocessor and data storage.

14. The access control system of claim 9, wherein the system third control device automatically invalidates the one of the first or second portable access cards after a specified period of inactivity.

15. The access control system of claim 9, wherein the third control device includes a computer having programmable code embodied on computer readable medium; and a user interface for communicating with the computer for allowing a user to edit portable access card information and view an event log.

* * * * *